Feb. 9, 1971  D. E. PICKERING  3,561,186
METHOD OF EVACUATING HOLLOW BODIES
Filed April 17, 1968
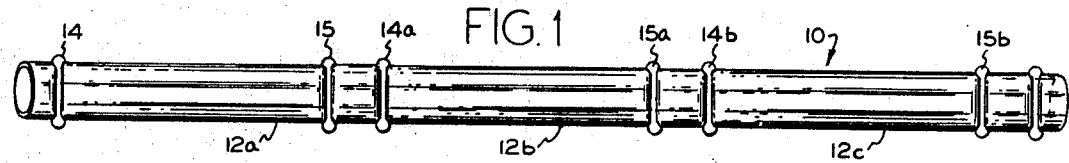
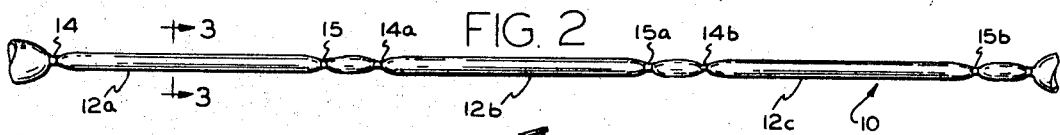
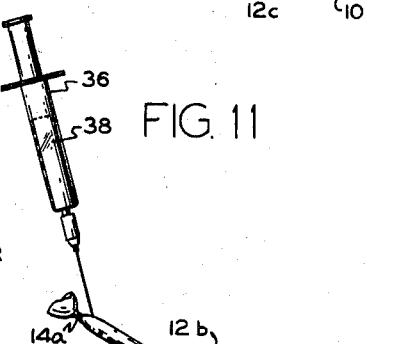
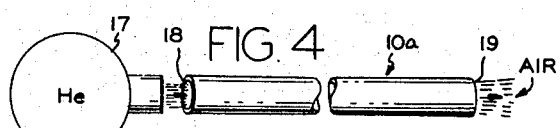
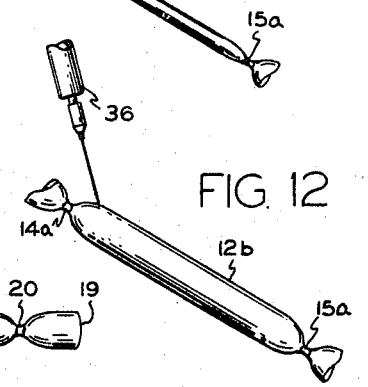
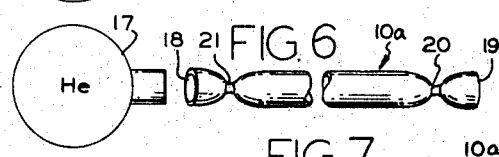
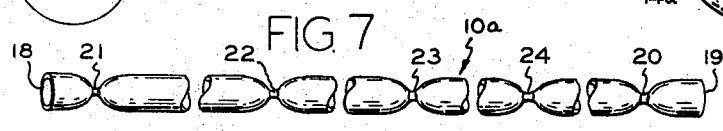
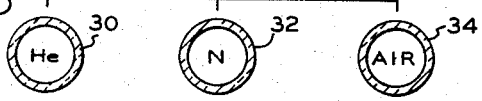
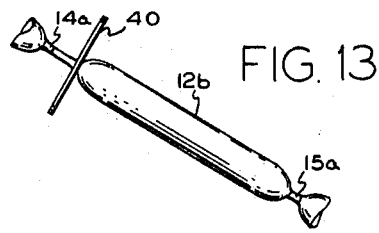
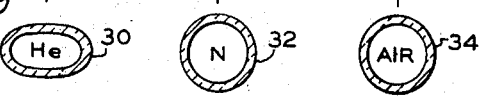
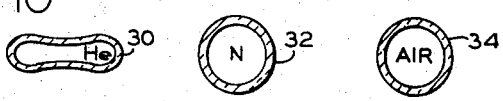
DONALD E. PICKERING
INVENTOR
BY
BUCKHORN, BLORE, KLARQUIST & SPARKMAN
ATTORNEYS

United States Patent Office 3,561,186
Patented Feb. 9, 1971

3,561,186
METHOD OF EVACUATING HOLLOW BODIES
Donald E. Pickering, 830 NW. St. Helens Ave.,
Portland, Oreg. 97229
Filed Apr. 17, 1968, Ser. No. 721,999
Int. Cl. B65b *31/00*
U.S. Cl. 53—22                                3 Claims

ABSTRACT OF THE DISCLOSURE

A method of creating a vacuum within a sealed, hollow body such as flexible plastic tubing which includes (1) purging the tubing of air by blowing a stream of helium through the open ends of the tubing, then (2) sealing the opposite ends of the tubing to entrap helium therein and then (3) storing the helium-filled, sealed tubing in an atmosphere of air so as to permit the helium to pass outwardly through the walls of the tubing without being replaced by air, thereby creating a vacuum condition within the interior of the tubing which remains until the seal is broken and which causes the sealed tubing to collapse.

BACKGROUND OF THE INVENTION

(a) Field of the invention

The present invention relates to the evacuation of air and other gases from hollow bodies and more particularly to a method of creating a vacuum condition within a hollow body without the use of a vacuum pump.

(b) Description of the prior art

The conventional manner of creating a vacuum within a hollow body is by drawing air from the body with a vacuum pump. However, this method is slow, cumbersome and impractical in many instances, especially as applied to small bodies such as laboratory containers used in handling laboratory specimens and reagents. Often it is desirable to handle substances such as blood samples in an air-free environment to avoid contamination and prevent clotting. In my prior copending patent application Ser. No. 710,974 filed on Mar. 6, 1968, I disclose a system for handling laboratory specimens and reagents in flexible transparent plastic tube segments which are pre-sealed at their ends prior to use to maintain the segments in a sterile condition until ready for use. However, heretofore there has been no practical way of creating a vacuum wihin such tube segments, and no procedure to enable the handling and transfer of specimens and reagents from one container to another with no appreciable air contact. Thus in many instances laboratory tests have had to be conducted with maximum speed, and therefore with maximum possibility for error. As a result, tests frequently have had to be repeated, and test results in some instances have been of questionable reliability.

The aforementioned sealed, flexible tube segments, because they are filled with air or other entrapped gases prior to use, have been bulky to ship and store, creating space problems. Rigid walled containers, of course, present the same space problems.

SUMMARY OF THE INVENTION

The invention provides a method of creating a vacuum within a hollow body with the use of helium. The method has particular application to the preparation of flexible, plastic laboratory tubing for the handling of laboratory substances in an air-free, sterile environment. The method as applied to such tubing leaves the tubing in a collapsed condition prior to use, thereby conserving shipping and storage space.

In its broader aspect the invention involves a method of creating a vacuum within any hollow body which is impervious to air and most other gases but pervious to the passage of helium or a similar inert gas.

Primary objects of the invention are to provide:

(1) A new, improved and simplified method of evacuating hollow bodies without the use of a vacuum pump;

(2) A method as aforesaid which creates a more complete vacuum with less effort than prior methods;

(3) A method as aforesaid which utilizes helium as the vacuum creating agent;

(4) A method of preparing flexible laboratory tubing for use in the handling of specimens and reagents with a minimum possibility of air contact and contamination;

(5) A method of preparing tubing as aforesaid which leaves the tubing in a collapsed, sealed condition prior to use;

(6) A method as aforesaid which is simpler, less expensive and more effective than prior methods of evacuating tubing;

(7) An improved container for handling laboratory substances which can be shipped and stored in a sterile, sealed, collapsed and gas-free condition until use.

BRIEF DESCRIPTION OF THE DRAWING

The foregoing and other objects and advantages of the present invention will become more apparent from the following detailed description which proceeds with reference to the accompanying drawing wherein:

FIG. 1 is a plan view of a length of tubing which has been evacuated in accordance with the method of the present invention;

FIG. 2 is a side view of the tubing of FIG. 1;

FIG. 3 is an enlarged cross-sectional view taken along the line 3—3 of FIG. 2;

FIGS. 4, 5, 6 and 7 illustrate the steps in performing the method of the present invention;

FIGS. 8, 9 and 10 are cross-sectional views through three different tubing segments, illustrating some test results in performing the method with different gases; and FIGS. 11, 12 and 13 illustrate the steps in filling a tube segment, prepared in accordance with the invention, with a specimen.

DETAILED DESCRIPTION

With reference to the drawing, FIGS. 1, 2 and 3 illustrate a length of tubing 10 to which the present method can be applied, such tubing being divided into a series of segments 12a, 12b, 12c, sealed at their opposite ends by heat seals 14, 15, 14a, 15a, and 14b, 15b, which link the segments together. The tubing is composed of a flexible, resilient plastic material which is preferably transparent or translucent when used for laboratory purposes. An example of a suitable tubing is Tygon brand S–50–HL surgical tubing manufactured by U.S. Stoneware Co. of Akron, Ohio. Such tubing is also thermoplastic so that it can be sealed by heat as well as by mechanical or other means. The tubing exhibits a chemical inertness toward biological specimens such as blood and other body fluids as well as toward most chemical solutions used in the laboratory. The tubing is also capable of sterilization by chemicals, steam heat or electromagnetic radiation, as for example, by gamma radiation, without loss of its above-mentioned properties. The most important property of the tubing for purposes of the present method is its perviousness or at least semiperviousness to the passage of helium gas while being impervious to air and most other commonly occurring gases such as, for example, nitrogen. No doubt other materials might found which exhibit the same properties with respect to its perviousness to helium and imperviousness to air.

The sealed tube segments, when evacuated of all gases in accordance with the method of the invention, assume a flattened, collapsed appearance when stored at normal room temperature and atmospheric pressure. Thus the tubing has a minimal bulk which adapts it for ease of shipment and storage.

In performing the method of the invention, the tubing is sterilized by heat, steam, chemical or radiation techniques well known in the medical field. The tubing in its initial condition is open at both ends and unsegmented as shown in FIG. 4. In such condition, a stream of helium gas from a source 17 under pressure is directed into one end 18 of the length of tubing 10a to purge its interior of air by forcing the air from its opposite end 19. After the tubing has been purged with helium for a sufficient time to ensure that all substantial traces of air have been removed, end 19 is sealed at 20 either by a heat seal as shown in FIG. 5 or with a mechanical clip such as the clip shown in my aforementioned copending application Ser. No. 710,974, or with a hemostat or some other suitable means. With the tube still filled with helium and thus fully expanded, the opposite end 18 is sealed at 21 to entrap helium within the tubing. The tubing may then be further subdivided into segments with additional heat seals 22, 23, 24 as shown in FIG. 7.

Immediately after the opposite ends of the tubing are sealed, the helium gas within the tubing will maintain the segments in an expanded condition as shown in FIG. 7. However, when the tubing is retained in an atmosphere of air or gas other than helium, the tubing will gradually collapse to the condition shown in FIG. 3 as helium gas gradually escapes through the helium-pervious walls of the tubing to atmosphere, creating a vacuum within the tubing. Since air and other gases in the atmosphere, such as nitrogen, cannot penetrate the walls of the tubing, the tubing segments will remain in a collapsed, air and other gas-free state until the gas seal is broken to admit air or a desired substance. It has been found that approximately forty-eight to seventy-two hours are required to completely collapse the tubing to the flattened condition shown in FIG. 3.

Test

In one test, three different lengths of Tygon brand S-50-HL surgical tubing of identical diameters and thicknesses were filled respectively with helium, nitrogen and air and then divided into segments with double heat seals, using the techniques illustrated in FIGS. 4 through 7. After the segments were filled, each sealed segment of all three lengths of tubing were fully expanded as shown in FIG. 8, wherein segment 30 is filled with helium, segment 32 with nitrogen and segment 34 with air. Then all three segments were maintained at room temperature and at standard atmospheric pressure for a period of seventy-two hours. At the end of the first twenty-four hour period, the tube segments 30 filled with helium and assumed an oval appearance as shown in FIG. 9. The segments 32 and 34 filled with nitrogen and air, however, remained fully expanded and circular in cross section. At the end of seventy-two hours the tube segments 30 were fully collapsed and flattened as shown in FIG. 10, whereas the nitrogen and air-filled segments 32 and 34 still remained fully expanded and circular. In fact after one full week, the three segmented lengths still remained in the shapes that prevailed at the end of the seventy-two hour period.

Applications

The foregoing test results suggest a number of applications for the present method of evacuating tubing and other hollow bodies. First, it suggests a method of creating a vacuum within any hollow body which is pervious to helium or another single gas but impervious to air and other gases within the atmosphere in which the body will subsist. For example, the envelopes of vacuum tubes used in electronics might be evacuated in the foregoing manner.

Second, any rigid-walled or other hollow body might be provided with a small wall section of material pervious to helium but impervious to other gases so that at least a partial vacuum condition could be created within the body.

A third and at present most promising area of use for the method is in the preparation of tubing segments for the handling and laboratory use of microbiological and biomedical specimens and reagents in the manner described in my aforementioned prior copending application Ser. No. 710,974.

In such application the tubing would first be sterilized and purged of air with helium in the aforedescribed manner and then stored until collapsed. When totally collapsed, the flattened, sealed and sterilized tubing would be shipped to laboratories, clinics and other destinations for their intended laboratory and medical uses. A sealed and evacuated segment would be used, for example, to retain a blood sample in the following manner:

First a segment such as the segment 12b of the length 10 shown in FIG. 2 would be detached from the linked segments. Then a hypodermic syringe 36 in which a sample of blood 38 has been collected from a subject would be transferred directly into tube segment 12b by inserting the sharp pointed end of the syringe through a wall of the segment near one sealed end as shown in FIG. 11. No other opening would be needed since there is no air or other gas in the tube to be displaced. When the blood is injected by the syringe into the tube segment, the segment would expand as shown in FIG. 12. When the segment is filled to a point just below the opening made by the syringe, the segment would be resealed at a point just below such opening using, for example, one of the sealing clips 40 of the type described in my aforementioned copending application, in the manner shown in FIG. 13. Thereafter the tube segment could be shipped to a laboratory, via the mails if desired, and its contents centrifuged or otherwise processed and tested in accordance with the procedures described in my aforementioned copending application.

It will be noted that in handling the blood specimen in accordance with the procedures described with respect to FIGS. 11 through 13, at no time did the blood specimen have an opportunity to come in direct contact with the ambient air. Thus premature clotting would not be a problem, and laboratory procedures in connection with the blood specimen could be carried out with care and at a reasonable pace.

In summary, the foregoing described method of evacuating tubing provides an air-free, sterile, inert container for handling and processing blood and other biological fluids, and other specimens, reagents and substances commonly used in chemical, medical, biological and other laboratories of the physical sciences.

Having described what is presently a preferred embodiment of my invention, it should be apparent to those having skill in the art that the same permits of modification in arrangement and detail. I claim as my invention all such modifications as come within the true spirit and scope of the following claims.

I claim:

1. A method of preparing plastic tubing for packaging, handling and processing laboratory or other liquid biomedical, microbiological and other specimens or reagents, said method comprising the steps:

selecting a length of flexible sterile tubing which is open at both ends and made of a material which is inert with respect to the specimens or reagents to be handled and pervious to helium but impervious to air and liquid, in the absence of any liquid or solid material within said tubing, purging said tubing of air by directing a stream of helium therethrough from end to end, while continuing to purge said tubing with said helium and still in the absence of any liquid or solid material within said tubing, sealing the opposite ends of said tubing to entrap a quantity of said helium within said tubing, then still in the absence of any liquid or solid material within said tubing, evacuating said tubing of said helium by storing said tubing with its end remaining sealed in an atmosphere of air until said tubing collapses, and then introducing a liquid specimen or reagent into said collapsed tubing to collect said liquid therewithin while minimizing contact of said liquid with air and other gases.

2. A method of packaging, handling and processing liquid biological specimens and reagents in an air-free, sterile environment comprising:

selecting a length of seamless sterile flexible tubing which is open at both ends, made of a material which is inert with respect to the liquid specimen or reagent being handled, impervious to air and liquids and pervious to helium, and capable of assuming a generally circular cross-sectional shape when filled with liquid, purging the tubing of air and filling said tubing with helium, sealing the opposite ends of said tubing to entrap helium within said tubing, evacuating said sealed tubing to collapse the same by storing said sealed tubing at atmospheric air pressure or below, collecting a liquid biological specimen or reagent while preventing the exposure of the same to air, then introducing said liquid biological specimen or reagent into said collapsed tubing while preventing the entry of air therein to expand the walls of said tubing whereby said walls assume a generally circular shape, resealing said tubing following the introduction of said specimen, and thereafter storing, transporting, processing and testing said specimen as desired while such specimen remains within said tubing.

3. A container for performing the method of claim 2 including:

a length of sterile, seamless, flexible plastic tubing composed of a material pervious to helium, impervious to air and liquids, and capable of assuming a generally circular cross-sectional shape when filled with liquid, said tubing being sealed at both ends and in a substantially air-free condition internally so that said tubing has generally collapsed walls when in an ambient atmosphere of air and when not filled with liquid, and a mechanical sealing clip for sealing an end of said tubing through pinching engagement with said end.

References Cited
UNITED STATES PATENTS

| 3,343,331 | 9/1967 | French | 53—22 |
| 3,364,958 | 1/1968 | Sartor et al. | 53—7 |
| 3,389,534 | 6/1968 | Pendleton | 53—79X |

TRAVIS S. McGEHEE, Primary Examiner

U.S. Cl. X.R.

23—292; 150—.5